United States Patent
Kobayashi et al.

(10) Patent No.: US 6,599,976 B2
(45) Date of Patent: Jul. 29, 2003

(54) COATING PROCESS AND SILICON-CONTAINING LIQUID COMPOSITION

(75) Inventors: Katsuo Kobayashi, Ibaraki-ken (JP); Wakako Fukamachi, Ibaraki-ken (JP); Naoki Honma, Tokyo (JP); Nobuyuki Matsuzoe, Kitakyushu (JP); Takeshi Sawai, Kitakyushu (JP)

(73) Assignees: Mitsubishi Chemical Corporation, Tokyo (JP); Dainippon Shikizai Kougyo Co., Ltd., Tokyo (JP)

( * ) Notice: Subject to any disclaimer, the term of this patent is extended or adjusted under 35 U.S.C. 154(b) by 0 days.

(21) Appl. No.: 09/991,875

(22) Filed: Nov. 26, 2001

(65) Prior Publication Data

US 2003/0109633 A1 Jun. 12, 2003

(51) Int. Cl.[7] .......................... C08L 83/02; C08G 77/06
(52) U.S. Cl. ...................... 524/837; 524/588; 524/859; 528/12; 556/450; 556/455; 556/457
(58) Field of Search ............................... 556/450, 455, 556/457; 528/12; 524/588, 837, 859; 106/287.13, 287.16; 427/255.27, 387; 428/446, 447

(56) References Cited

U.S. PATENT DOCUMENTS

| | | | | |
|---|---|---|---|---|
| 5,223,030 A | * | 6/1993 | Valette et al. | 106/38.2 |
| 5,618,628 A | * | 4/1997 | Volpe | 428/450 |
| 5,958,514 A | * | 9/1999 | Havey et al. | 427/386 |
| 6,016,689 A | * | 1/2000 | Bright et al. | 73/31.05 |

OTHER PUBLICATIONS

Machine Translation and Derwent abstract of JP 05–085714, 04–19993, Akihiko obtained from JPO website and Derwent database.*

* cited by examiner

*Primary Examiner*—Robert Dawson
*Assistant Examiner*—Jeffrey B. Robertson
(74) *Attorney, Agent, or Firm*—Nixon & Vanderhye P.C.

(57) ABSTRACT

The present invention relates to a silicon-containing liquid composition comprising (A) 100 parts by weight of an organosilicate, calculated as $SiO_2$, (B) 0.1 to 10 parts by weight of a catalyst, (C) 100 to 50,000 parts by weight of water, and (D) 100 to 50,000 parts by weight of a solvent, a weight ratio of the water (C) to the solvent (D) being in the range of 30:70 to 80:20.

1 Claim, No Drawings

COATING PROCESS AND SILICON-CONTAINING LIQUID COMPOSITION

BACKGROUND OF THE INVENTION

The present invention relates to a coating process capable of preventing a painted or non-painted surface of building structures, civil engineering structures, industrial equipments, traffic signs and the like from being contaminated with dirt or oils, or readily removing contaminants attached thereto by falling rain or wiping, and a liquid composition suitably used in the coating process.

In recent years, great importance is placed on an appearance of building structures, civil engineering structures, etc., for maintaining its harmonization with surrounding urban sights. For this reason, the surface of such structures has been finish-coated with various low-staining paints in order to enhance an anti-staining property thereof. As the conventional low-staining finish-coating methods, there are known those methods in which high weather-resistant organic paints such as fluororesin-based paints, acrylic silicone-based paints and urethane-based paints are used to form a finish coat (top coat).

Also, recently, such a composition prepared by adding a small amount of alkylsilicate to these paints has been used to impart a hydrophilic property to the surface of the resultant coating film, thereby preventing various contaminants such as dirt and oils from being attached thereto, and allowing these contaminants, if attached, to be readily washed off by water drops of falling rain or the like. On the other hand, inorganic paints composed mainly of organopolysiloxanes have been positively developed and recently commercialized because these inorganic paints are usually excellent in weather resistance, durability, chemical resistance, heat resistance or the like as compared to the above organic paints.

However, in the case where these organic or inorganic paints are used to form a top coat, there are commonly required time-consuming additional steps for forming an undercoat and, if necessary, an intermediate coat between the structure (base material) and the top coat in order to further enhance the adhesion therebetween. In particular, the coating film made of the organic paints tends to be readily contaminated with sand and dust, metal powder, falling rain (e.g., acidic rain) or exhaust gases when exposed thereto, resulting in deteriorated appearance of the structure.

Also, the paints for top coat which are prepared by adding a small amount of alkylsilicate to these organic paints, tend to suffer from various problems such as increase in its viscosity upon storage, cracks and poor film properties of a coating film produced therefrom, or the like. Therefore, care must be taken upon handling and application of these organic paints. On the other hand, many of the inorganic paints also tend to undergo various problems such as poor storage stability and cracks of thick coating films similarly to the above organic paints containing a small amount of alkylsilicate, and further require an additional heat-curing step. Therefore, care must also be taken upon handling and application of these inorganic paints.

In addition, the above paints are classified into dangerous substances under the Fire Protection Law because they contain a large amount of volatile organic solvents. Thus, great care must be needed for safe handling thereof. A present, it has been strongly required to solve the above problems concerning safety of paints and properties of resultant coating films as well as workability and safety upon coating.

As a result of the present inventors' earnest studies for solving the above problems, it has been found that by wiping the surface of painted or non-painted structures such as building structures, civil engineering structures, industrial equipments and traffic signs with a paper, cloth, non-woven fabric, etc., which is impregnated with a specific silicon-containing liquid composition mentioned below, or by spray-coating the surface of the painted or non-painted structures with an aerosol formed of the specific silicon-containing liquid composition, the obtained coating film can prevent the surface of the structures from being contaminated, or can allow contaminants, if attached thereto, to be readily removed therefrom. The present invention has been attained on the basis of this finding.

SUMMARY OF THE INVENTION

An object of the present invention is to provide a coating composition which can be applied directly or through a previous coating film onto the surface of various structures such as building structures and civil engineering structures without formation of any underlying coat, thereby imparting excellent properties such as anti-staining property and weather resistance thereto, and a coating process using the coating composition.

To accomplish the aims, in a first aspect of the present invention, there is provided a silicon-containing liquid composition comprising (A) 100 parts by weight of an organosilicate, calculated as $SiO_2$, (B) 0.1 to 10 parts by weight of a catalyst, (C) 100 to 50,000 parts by weight of water, and (D) 100 to 50,000 parts by weight of a solvent, a weight ratio of the water (C) to the solvent (D) being in the range of 30:70 to 80:20.

In a second aspect of the present invention, there is provided a silicon-containing liquid composition as defined in the first aspect, having a hydrolysis percentage of 1,000 to 90,000%.

In a third aspect of the present invention, there is provided a silicon-containing liquid composition as defined in the first aspect, further comprising (E) at least one additive selected from the group consisting of pigments, fillers and paint additives.

In a fourth aspect of the present invention, there is provided a silicon-containing liquid composition as defined in the first aspect, wherein the organosilicate (A) is represented by the general formula:

$$SiO_x(OR)_y$$

wherein x is a number of 0 to 1.2, and y is a number of 1.4 to 4 with the proviso that (2x+y) is 4; and R is $C_1$ to $C_4$ alkyl.

In a fifth aspect of the present invention, there is provided a silicon-containing liquid composition as defined in the first aspect, wherein the organosilicate (A) is methyl silicate.

In a sixth aspect of the present invention, there is provided a coating process comprising:

coating a surface of a structure with the silicon-containing liquid composition as defined in the first aspect so as to prevent the surface of the structure from being contaminated.

In a seventh aspect of the present invention, there is provided a coating process comprising:

coating a surface of an inorganic structure with the silicon-containing liquid composition as defined in the first aspect so as to prevent the surface of the inorganic structure from being contaminated.

In an eighth aspect of the present invention, there is provided a coating process comprising:

forming the silicon-containing liquid composition as defined in the first aspect into an aerosol; and spray-coating the aerosol onto a surface of a structure.

In a ninth aspect of the present invention, there is provided a coating process comprising:

wipe-coating a surface of a structure with the silicon-containing liquid composition as defined in the first aspect.

In a tenth aspect of the present invention, there is provided a coating film produced from the silicon-containing liquid composition as defined in the first aspect, said coating film having a surface resistivity of $7.5\times10^{7}$ to $1.5\times10^{12}$.

In an eleventh aspect of the present invention, there provided a coating film produced from the silicon-containing liquid composition as defined in the first aspect, said coating film having a water contact angle of 5° to 35°.

In a twelfth aspect of the present invention, there is provided a silicon-containing liquid composition comprising (A) 100 parts by weight of an organosilicate, calculated as $SiO_2$, (B) 0.1 to 10 parts by weight of a catalyst, (C) 5,000 to 30,000 parts by weight of water, and (D) 5,000 to 30,000 parts by weight of a solvent, and having a hydrolysis percentage of 10,000 to 90,000%, a weight ratio of the water (C) to the solvent (D) being in the range of 30:70 to 80:20, said composition being produced by contacting (A) 100 parts by weight of the organosilicate, calculated as $SiO_2$, (B) 0.1 to 10 parts by weight of the catalyst; (C) 500 to 5,000 parts by weight of the water; and (D) 100 to 5,000 parts by weight of the solvent, with each other; reacting a resultant mixture until a hydrolysis percentage thereof reaches 1,000 to 90,000%; and diluting a resultant reaction mixture with additional amounts of the water (C) and the solvent (D) to adjust a final hydrolysis percentage thereof into 10,000 to 90,000%.

In accordance with the present invention, it is possible to enhance properties such as anti-staining property and weather resistance only by applying the specific silicon-containing liquid composition directly or through a previous coating film onto the surface of non-painted or painted structures. In particular, when painted articles or plastic molded articles placed outside are coated with the present composition, it becomes possible to prevent these articles from being contaminated, and further impart a self-cleaning effect, i.e., an ability of removing contaminants attached thereto by falling rain, thereby allowing the coated surface to show an anti-staining property for a long period of time.

The properties of the thus-obtained coating film are further enhanced by incorporating into the composition, various additives including pigments, fillers and/or paint additives such as anti-sag agents, leveling agents, anti-cissing agents, adhesion modifiers, algaecides, bactericides, deodorants and ultraviolet light absorbers.

DETAILED DESCRIPTION OF THE INVENTION

In the present invention, there is used a silicon-containing liquid composition prepared by blending the following components (A) to (D) and, if required, the component (E) with each other.

The component (A) is an organosilicate, i.e., a compound containing organic groups respectively bonded to silicon atom through oxygen atom. As the organosilicate, there may be exemplified organoxysilanes containing four organic groups each bonded to one common silicon atom through oxygen atom, and organoxysiloxanes having a siloxane main chain ($(Si—O)_n$) constituted by silicon atoms.

The organic groups bonded to silicon atom through oxygen atom are not particularly restricted, and may include, for example, linear, branched or cyclic alkyl groups. Specific examples of the organic groups may include methyl, ethyl, n-propyl, i-propyl, n-butyl, i-butyl, t-butyl, n-pentyl, i-pentyl, neopentyl, hexyl, octyl or the like. Of these alkyl groups, $C_1$ to $C_4$ alkyl groups are especially preferred. Examples of the other organic groups may include aryl, xylyl, naphthyl or the like. The organosilicate may contain two or more different kinds of organic groups.

The preferred alkyl groups are those having 1 to 4 carbon atoms, and may have either a linear or branched structure. Examples of the preferred alkyl groups may include methyl, ethyl, n-propyl, i-propyl, n-butyl, i-butyl, sec-butyl or the like. These alkyl groups may be used in the form of a composite and/or a mixture thereof. Namely, two or more different kinds of alkyl groups may be used as the organic groups. Of these alkyl groups, methyl and/or ethyl are preferred from the standpoints of good solubility of the organosilicate in the silicon-containing liquid composition as well as low-staining property of the obtained coating film. Among them, methyl is most preferred.

When the alkyl groups having more than four carbon atoms are used, the obtained silicon-containing liquid composition exhibits a low solubility, thereby requiring the use of a large amount of organic solvents. Such a composition have many problems upon handling since the composition is classified into dangerous substances under the Fire Protection Law because of the large content of organic solvents. In addition, the alkyl groups having more than four carbon atoms shows a poor hydrolyzability, so that production of SiOH groups in the obtained coating film becomes too slowly when exposed to outside environments, thereby failing to exhibit a good anti-staining property.

Examples of the organoxysilanes may include tetramethoxysilane, tetraethoxysilane, tetrapropoxysilane, tetrabutoxysilane, tetraphenoxysilane, dimethoxydiethoxysilane or the like. Examples of the organoxysiloxanes may include condensates of the above organoxysilanes. The condensation degree of the organoxysiloxanes is not particularly restricted, and preferably lies within the range represented by the following formula:

$$SiO_x(OR)_y$$

wherein x is $0 \cdot x \cdot 1.2$, and y is $1.4 \cdot y \cdot 4$ with the proviso that (2x+y) is 4; and R is an organic group, preferably $C_1$ to $C_4$ alkyl.

The factor or subscript x represents the condensation degree of the siloxane. When the siloxane shows a molecular weight distribution, the factor x means an average condensation degree. Compounds represented by the above formula wherein x=0, are organoxysilanes as a monomer, and compounds represented by the above formula wherein $0<x<2$, are oligomers corresponding to condensates obtained by partial hydrolysis condensation. Also, compounds represented by the above formula wherein x=2, corresponds to $SiO_2$ (silica). The condensation degree x of the organosilicate used in the present invention is preferably in the range of 0 to 1.2, more preferably 0 to 1.0. The siloxane main chain may have a linear, branched or cyclic structure or a mixture thereof.

The organosilicates having a condensation degree x as high as more than 1.2 have a high molecular weight and, therefore, a high viscosity. Such organosilicates tend to be readily gelled upon storage, resulting in poor storage stability. Thus, it is difficult to practically use such organosilicates having a condensation degree x of more than 1.2. In addition, since the organosilicates exhibit a poor solubility in organic solvents, a large amount of organic solvents are required to prepare the silicon-containing liquid composition of the present invention. Therefore, the obtained silicon-containing liquid composition tends to undergo various handling problems since the composition containing a large amount of organic solvents is regarded as dangerous substances under the Fire Protection Law.

The above formula: $SiO_x(OR)_y$ may be determined by the following method. The condensation degree x can be readily obtained by Si-NMR measurement. Specifically, assuming that a chemical shift value of tetramethylsilane as a standard substance is 0 ppm, the organosilicate shows 5 groups of peaks $Q_0$, $Q_1$, $Q_2$, $Q_3$ and $Q_4$ between −75 to 120 ppm as its chemical shift value. The respective peaks are based on the number of siloxane bonds constituted by silicon atoms. The peak $Q_0$ corresponds to a monomer having no siloxane bond; $Q_1$ corresponds to a compound having one siloxane bond; $Q_2$ corresponds to a compound having two siloxane bonds; $Q_3$ corresponds to a compound having three siloxane bonds; and $Q_4$ corresponds to a compound having four siloxane bonds. After area ratios of these peaks are determined, the condensation degree x is calculated from the following formula:

$$X = A \times 0 + B \times 0.5 + C \times 1.0 + D \times 1.5 + E \times 2$$

wherein A, B, C, D and E are area ratios of $Q_0$, $Q_1$, $Q_2$, $Q_3$ and $Q_4$, respectively, with the proviso that $A+B+C+D+E=1$. In the case of silica ($SiO_2$), the condensation degree is 2. The factor y of the above formula is determined by the following equation:

$$2x+y=4.$$

Meanwhile, in the case where the organosilicate contains two or more different kinds of organic groups, the amounts of the respective organic groups bonded can be readily determined by H—NMR or $^{13}$C—NMR measurement. In this case, the measurement is carried out by an appropriate method capable of readily identifying the chemical shift.

Specific examples of the preferred organosilicates used in the present invention may include tetramethoxysilane, tetraethoxysilane, tetra-n-propoxysilane, tetraisopropoxysilane, tetra-n-butoxysilane, tetraisobutoxysilane, tetra-sec-butoxysilane, tetra-t-butoxysilane and/or partially hydrolyzed condensates thereof. These organosilicates may be used alone or in combination of any two or more thereof. Among these organosilicates, tetramethoxysilane and/or partially hydrolyzed condensates thereof are preferred for the following reasons. That is, the tetramethoxysilane and/or partially hydrolyzed condensates thereof show a high reactivity for hydrolysis and, therefore, can readily produce silanol groups. As a result, only a small amount of organic solvent is required to prepare a uniform liquid composition. Thus, the use of the tetramethoxysilane and/or partially hydrolyzed condensates thereof is especially preferable for solving the safety problems since the high anti-staining liquid composition which is not classified into dangerous substances under the Fire Protection Law can be readily prepared therefrom.

The organosilicates contain organic groups respectively bonded to silicon atom through oxygen atom. Also, the silicon-containing liquid composition of the present invention may contain other organosilicon compounds than the organosilicates, for example, those silicon compounds having organic groups directed bonded to each other through silicon atom. As the other organosilicon compounds, there may be exemplified various silane coupling agents or the like. Specific examples of the other organosilicon compounds may include trialkoxysilane compounds or partially hydrolyzed condensates thereof such as methyl trimethoxysilane, methyl triethoxysilane, methyl tripropoxysilane, methyl triisopropoxysilane, ethyl trimethoxysilane, ethyl triethoxysilane, ethyl tripropoxysilane, ethyl triisopropoxysilane, propyl trimethoxysilane, propyl triethoxysilane, butyl trimethoxysilane, butyl triethoxysilane, pentyl trimethoxysilane, pentyl triethoxysilane, hexyl trimethoxysilane, hexyl triethoxysilane, phenyl trimethoxysilane, phenyl triethoxysilane, phenyl tripropoxysilane, phenyl triisopropoxysilane, benzyl trimethoxysilane, benzyl triethoxysilane, 3-glycidoxypropyl trimethoxysilane, 3-glycidoxypropyl triethoxysilane, 2-(3,4-epoxycyclohexyl)ethyl trimethoxysilane, 2-(3,4-epoxycyclohexyl)ethyl triethoxysilane, 3-methacryloxypropyl trimethoxysilane, 3-methacryloxypropyl triethoxysilane, vinyl trimethoxysilane, vinyl triethoxysilane, 3-mercaptopropyl trimethoxysilane, 3-mercaptopropyl triethoxysilane, 3-aminopropyl triethoxysilane, N-(2-aminoethyl)-3-aminopropyl trimethoxysilane and 3-ureidopropyl triethoxysilane; dialkoxysilane compounds and partially hydrolyzed condensates thereof such as dimethyl dimethoxysilane, dimethyl diethoxysilane, diethyl dimethoxysilane, diethyl diethoxysilane, diphenyl dimethoxysilane, diphenyl diethoxysilane, 3-glycidoxypropylmethyl dimethoxysilane, 3-methacryloxypropylmethyl dimethoxysilane, 3-mercaptopropylmethyl dimethoxysilane, 3-aminopropylmethyl dimethoxysilane and N-(2-aminomethyl)-3-aminopropylmethyl dimethoxysilane; chlorosilane compounds and partially hydrolyzed condensates thereof such as methyl trichlorosilane, vinyl trichlorosilane, phenyl trichlorosilane, methyl dichlorosilane, dimethyl dichlorosilane, dimethyl chlorosilane, methylvinyl dichlorosilane, 3-chloropropylmethyl dichlorosilane, diphenyl dichlorosilane and methylphenyl dichlorosilane; 3-mercaptopropyl trimethoxysilane; 3-mercaptopropylmethyl dimethoxysilane; 3-mercaptopropyl triethoxysilane; 3-mercaptopropylmethyl diethoxysilane; 3-aminopropyl trimethoxysilane; 3-aminopropyl triethoxysilane; N-3-trimethoxysilylpropyl-m-phenylenediamine; N,N-bis[3-(methyldimethoxysilyl)propyl]ethylenediamine; N,N-bis[3-(trimethoxysilyl)propyl]ethylenediamine; N-(2-aminoethyl)-3-aminopropylmethyl dimethoxysilane; N-(2-aminoethyl)-3-aminopropyl trimethoxysilane; P-[N-(2-aminoethyl) aminomethyl]phenethyl trimethoxysilane; or the like.

The silicon-containing liquid composition of the present invention may contain the above other organosilicon compounds in an amount of not more than 25 parts by weight, more preferably not more than 10 parts by weight based on 100 parts by weight of the organosilicate (A) calculated as $SiO_2$. The other organosilicon compounds than the organosilicates contain a less amount of hydrolyzable functional groups as compared to those of the organosilicates and, therefore, are remarkably deteriorated in contribution to anti-staining property. As a matter of course, the composition of the present invention may not contain the other organosilicon compounds. Also, the silicon-containing liquid composition of the present invention may contain such a silicon compound containing hydrolyzable functional groups other than the organoxy groups such as various halogen elements. However, such a halogen-containing silicon compound tends to generate cumbersome substances such as hydrochloric acid, resulting in environmental problems. For this reason, the silicon compound may be contained in the composition in an amount of not more than 20 parts by weight, more preferably not more than 10 parts by weight, at most, based on 100 parts by weight of the organosilicate calculated as $SiO_2$. As a matter of course, the composition of the present invention may not contain such a silicon compound.

As the component (B), there may be use those catalysts capable of hydrolyzing the organosilicate. Specific examples of the catalyst (B) may include inorganic acids such as hydrochloric acid, sulfuric acid, nitric acid and phosphoric acid; organic acids such as acetic acid, benzenesulfonic acid, toluenesulfonic acid, xylenesulfonic acid, ethylbenzenesulfonic acid, benzoic acid, phthalic acid, maleic acid, formic acid and oxalic acid; alkali catalysts such as sodium hydroxide, potassium hydroxide, calcium hydroxide, ammonia and organic amine compounds; organometallic compounds or metal alkoxide compounds other than the organosilicates, e.g., organotin compounds such as dibutyl tin dilaurate, dibutyl tin dioctoate and dibutyl tin diacetate, organoaluminum compounds such as aluminum tris (acetylacetonate), aluminum monoacetylacetonate bis (ethylacetoacetate), aluminum tris(ethylacetoacetate) and ethylacetoacetate aluminum diisopropionate, organotitanium compounds such as titanium tetrakis(acetylacetonate), titanium bis(butoxy)-bis(acetylacetonate) and titanium tetra-n-butoxide, and organozirconium compounds such as zirconium tetrakis(acetylacetonate), zirconium bis(butoxy)-bis (acetylacetonate), zirconium (isopropoxy)-bis (acetylacetonate) and zirconium tetra-n-butoxide; boron compounds such as boron tri-n-butoxide and boric acid; or the like.

These catalysts may be used alone or in combination of any two or more thereof. In the case where the silicon-containing liquid composition of the present invention is applied onto the surface of painted or non-painted structures such as building structures, civil engineering structures, industrial equipments, transportation equipments and traffic signs, organometallic chelate compounds or metal alkoxide compounds are preferably used for preventing the base material thereof from being corroded by the catalyst.

The amount of the catalyst (B) added is preferably 0.1 to 10 parts by weight, more preferably 0.5 to 5 parts by weight based on 100 parts by weight of the organosilicate calculated as $SiO_2$. When the amount of the catalyst added is less than 0.1 part by weight, the obtained silicon-containing liquid composition is deteriorated in storage stability, and the coating film produced from the composition fails to exhibit a sufficient anti-staining property. When the catalyst is used in the above-specified range of 0.1 to 10 parts by weight, it is possible to impart a sufficient storage stability and film properties to the silicon-containing composition and the coating film produced therefrom, respectively. Therefore, it is not necessary to use the catalyst in an amount of more than 10 parts by weight. The catalyst (B) may be added by any suitable method, e.g., may be added in the form of a solution prepared by dissolving the catalyst in the organosilicate, or a solution prepared by dissolving the catalyst in water or the solvent. The catalyst may be mixed and dissolved in the organosilicate and/or water or the solvent at room temperature. If it is difficult to dissolve the catalyst at room temperature, the mixture may be heated.

The amount of water as the component (C) blended is 100 to 50,000 parts by weight, preferably 500 to 10,000 parts by weight based on 100 parts by weight of the organosilicate calculated as $SO_2$. This means that the water is added in a considerably excessive amount as compared to its stoichiometric amount capable of hydrolyzing organoxy groups of the organosilicate. It is considered that the addition of such an excessive amount of water allows silanol groups produced by hydrolysis of the organosilicate to coexist with a large amount of water, thereby preventing the condensation reaction of the silanol groups and, therefore, enhancing the storage stability of the obtained hydrolyzed liquid composition. In addition, since the amount of organic solvents added such as alcohols may be reduced, the obtained composition can exhibit a low flash point or burning point, thereby considerably improving the safety upon handling the composition.

When the amount of water (C) added is less than 100 parts by weight based on 100 parts by weight of the organosilicate calculated as $SiO_2$, the Si content in the obtained silicon-containing liquid composition becomes too large, so that the composition tends to be readily gelled, resulting in poor storage stability and low anti-staining property thereof upon practical use. When the amount of water (C) added is more than 50,000 parts by weight, the Si content in the obtained silicon-containing liquid composition is too small, so that the coating film produced therefrom fails to show a sufficient anti-staining property.

The silicon-containing liquid composition of the present invention preferably has a hydrolysis percentage of 1,000 to 90,000%. The water as the component (C) may be added at one time or stepwise. In the case where the water is added stepwise for diluting the composition, it is preferred that 500 to 5,000 parts by weight of water is first added in order to conduct a first stage of the hydrolysis reaction where the hydrolysis percentage of the composition is adjusted to 1,000 to 90,000%, and then 500 to 30,000 parts by weight of water is added to conduct a subsequent second stage of the hydrolysis reaction where the hydrolysis percentage of the composition is adjusted to 10,000 to 90,000%. Upon such a stepwise addition of water, the amount of the below-mentioned solvent added is preferably controlled in a stepwise manner.

The water (C) used in the present invention is not particularly restricted. For example, a tap water as well as a deionized water or a ultrapure water may be selectively used according to objects and requirements. For example, in the case where the composition of the present invention is applied to base materials readily corroded by acids such as soft steel, copper and aluminum, heat-resistant coats, moisture-proof coats, chemical-resistant coats, barrier coats, electric or electronic materials such as insulating coats, a desalted water may be suitably used. Also, in the case where the composition is applied to semiconductors or the like which should be free from inclusion of impurities, a ultrapure water may be suitably used.

The solvent as the component (D) is not particularly restricted. As the solvent, there may be usually used various organic solvents such as alcohols, glycol derivatives, hydrocarbons, esters, ketones, ethers or the like. These solvents may be used alone or in the form of a mixture of any two or more thereof. Specific examples of the alcohols may include methanol, ethanol, n-propanol, isopropanol, n-butanol, isobutanol, acetylacetone alcohol or the like.

Specific examples of the glycol derivatives may include ethylene glycol, ethylene glycol monomethyl ether, ethylene glycol monoethyl ether, propylene glycol, propylene glycol monomethyl ether, propylene glycol monoethyl ether, diethylene glycol monomethyl ether, diethylene glycol monoethyl ether, ethylene glycol monomethyl ether acetate, ethylene glycol monoethyl ether acetate, propylene glycol monomethyl ether acetate, propylene glycol monoethyl ether acetate or the like.

Specific examples of the hydrocarbons may include benzene, toluene, xylene, kerosene, n-hexane or the like. Specific examples of the esters may include methyl acetate, ethyl acetate, propyl acetate, butyl acetate, methyl acetoacetate, ethyl acetoacetate, butyl acetoacetate or the like. Specific examples of the ketones may include acetone, methyl ethyl ketone, methyl isobutyl ketone, acetyl acetone or the like. Specific examples of the ethers may include ethyl ether, butyl ether, methoxy ethanol, ethoxy ethanol, dioxane, furan, tetrahydrofuran or the like. Of these solvents, alcohols, especially $C_1$ to $C_3$ alcohols such as methanol, ethanol and isopropanol, or glycol derivatives such as propylene glycol monomethyl ether and diethylene glycol monoethyl ether, are preferred because these solvents can exhibit a good handling property, and can impart a good storage stability to the obtained silicon-containing liquid composition, and a good anti-staining property to the coating film produced from the composition.

The amount of the solvent (D) added is preferably 100 to 50,000 parts by weight, more preferably 500 to 10,000 parts by weight based on 100 parts by weight of the organosilicate calculated as $SiO_2$. When the amount of the solvent added is less than 100 parts by weight based on 100 parts by weight of the organosilicate calculated as $SiO_2$, it may be difficult to uniformly dissolve the organosilicate, the catalyst and water together. When the amount of the solvent added is more than 50,000 parts by weight, the Si content in the obtained silicon-containing liquid composition is too small, so that the coating film produced from the composition may not exhibit a sufficient anti-staining property. In addition, the composition containing such a large amount of the solvent is regarded as dangerous substances under the Fire Protection Law, resulting in poor handling property thereof. Meanwhile, the above-described amount of the solvent added includes an amount of alcohol produced by hydrolysis of the organosilicate in addition to amount of the solvent initially added.

The solvent (D) may be added at one time or stepwise. When the solvent is added stepwise for diluting the composition, it is preferred that 100 to 5,000 parts by weight of the solvent is first added together with water added at the first stage in order to conduct the first hydrolysis reaction, and then 5,000 to 30,000 parts by weight of the solvent is added together with water added for the second stage of the hydrolysis reaction.

Mixing of Respective Components for Preparation of Silicon-containing Liquid Composition Upon the preparation of the silicon-containing liquid composition of the present invention, the respective components (A), (B), (C) and (D) are uniformly mixed with each other at the above-specified mixing ratios, preferably until a transparent solution is obtained. The mixing temperature and mixing method are not particularly restricted. The mixing can be sufficiently conducted at about room temperature without heating. For example, the respective components (A) to (D) may be sequentially charged at room temperature into a mixing vessel, a mixing kiln, or a mixing container such as a mixer, a drum can and a kerosene can, and then mixed together by stirring, rotation, reverse rotation, vibration or the like, thereby preparing a uniform and transparent one-part type silicon-containing liquid composition. Alternatively, the silicon-containing liquid composition may be of a two-part type which comprises a main agent and a curing agent which are mixed together upon use. In the two-part type liquid composition, the main agent may be composed of alkylsilicate, and the curing agent may be in the form of a mixture of the catalyst, water and the organic solvent, or the main agent may be in the form of a mixture of the alkylsilicate and the catalyst, and the curing agent may be in the form of a mixture of water and the organic solvent, though not limited thereto.

In the present invention, the silicon-containing liquid composition may further contain as the component (E), an additive usable in ordinary paints such as pigments, e.g., colorants and extender pigments, fillers or the like. The amount of the component (E) added is not particularly restricted, and may be appropriately selected from such a range as not to adversely affect the effect of the present invention. Specific examples of the colorants as the additive (E) may include inorganic pigments such as titanium oxide, zinc oxide, carbon black, ferric oxide (iron oxide red), lead chromate, chrome yellow, yellow iron oxide, ochre, ultramarine blue and cobalt green; organic pigments such as azo-based, naphthol-based, pyrazolone-based, anthraquinone-based, perylene-based, quinacridone-based, bisazo-based, isoindolinone-based, benzoimidazole-based, phthalocyanine-based and quinaphthalone-based pigments; or the like. Specific examples of the extender pigments may include heavy calcium carbonate, clay, kaolin, talc, precipitated barium sulfate, barium carbonate, white carbon, diatomaceous earth or the like.

As the other additives usable as the component (E), there may be exemplified dispersing agents, anti-settling agents, anti-sag agents, delustering agents, plasticizers, defoamers, leveling agents, anti-cissing agents, adhesion modifiers, antiseptic agents, algaecides, bactericides, deodorants, ultraviolet light absorbers or the like. The additive may be added in a small amount as long as the aimed effect can be obtained by the addition of the additives. The amount of the additive added is not particularly restricted, and a sufficient effect can be obtained by adding the additive in an amount of usually 0.01 to 10.0 parts by weight, preferably 0.01 to 1.0 part by weight based on 100 parts by weight of the silicon-containing liquid composition of the present invention.

The method of adding the additive as the component (E) is not particularly restricted. For example, after all of the components (A) to (D) are blended together to prepare a one-part type silicon-containing liquid composition, the additive (E) may be added to the obtained composition. Alternatively, the additive (E) may be added to any of the alkylsilicate, water, the organic solvent and the like in which the additive can be readily dissolved or dispersed, followed by mixing the respective components together. Also, in the case of the two-part type silicon-containing liquid composition composed of the main agent and the curing agent which are mixed together upon use, the additive (E) may be added to either the main agent or the curing agent.

Thus, the silicon-containing liquid composition of the present invention can be produced by blending the above-described components together. The organosilicate content in the silicon-containing liquid composition is usually 0.05 to 15% by weight, preferably 0.1 to 10% by weight, calculated as $SiO_2$ in the organosilicate. When the organosilicate content is less than 0.05% by weight calculated as $SO_2$ in the organosilicate, the coating film formed on the surface of painted or non-painted structures such as building structures, civil engineering structures, industrial equipments, transportation equipments and traffic signs, fails to exhibit a sufficient anti-staining property. When the organosilicate content is more than 15% by weight calculated as $SiO_2$ in the organosilicate, such a composition having a too high organosilicate content tends to be gelled when stored, thereby causing problems such as poor storage stability upon practical use.

The thus obtained silicon-containing liquid composition of the present invention is capable of forming a colorless transparent coating film at ordinary temperature. The obtained coating film is an ultrathin film and, therefore, does not damage a touch of an underlying base material. Further, since the coating film exhibits an extremely low surface resistivity ranging from $7.5 \times 10^7$ to $1.5 \times 10^{12}$ ··cm, the chargeable voltage thereof is limited to not more than 10 mV, resulting in good anti-static property. In this case, as to friction coefficients of the coating film, the static friction coefficient thereof is 0.5 to 1.2, and the kinetic friction coefficient thereof is 0.3 to 1.2. Further, the coating film produced from the silicon-containing liquid composition of the present invention exhibits an excellent hydrophilic property, and has a water contact angle as low as 50 to 350. For this reason, the coating film is free from attachment of fur and fallstreifen. In addition, the coating film produced from the silicon-containing liquid composition of the present invention exhibits an excellent durability, especially a high resistance to acidic rain. Therefore, even when exposed to outside environments for a long period of time, the coating film can continuously maintain the above properties and can prevent the underlying material from being adversely affected. Also, the coating film exhibits an excellent chemical resistance. Therefore, even when the coating film is exposed to outside environments in snow country, snow-melting agents attached thereto such as calcium chloride can be removed only by water-washing, thereby inhibiting salt damage thereto.

Coating Method

The silicon-containing liquid composition of the present invention can be applied onto the surface of painted or non-painted structures such as building structures, civil engineering structures, industrial equipments, transportation equipments and traffic signs by simplified methods, e.g., by wipe-coating the surface of these structures with a paper, cloth or non-woven fabric impregnated therewith, or by spray-coating an aerosol thereof onto the surface of these structures. Also, the silicon-containing liquid composition of the present invention may be coated by various ordinary methods such as brush-coating, roller-coating and spray-coating, using a roll coater, a flow coater or the like.

As the structures to be coated with the silicon-containing liquid composition of the present invention, there may be exemplified civil engineering structures such as tunnels, dams, bridges, tanks and flues; building structures such as houses and buildings; cultural assets such as temples, shrines, stone statues and ruins; transportation equipments such as automobiles, air planes, railway rolling stocks and ships; industrial equipments; traffic signs; outdoor structures such as guard rails; or the like. These structures may be previously painted or non-painted. Specific examples of the surface to be coated with the composition of the present invention may include exterior and interior surfaces (inside and outside wall surfaces) of these structures, wall surfaces of bath room and kitchen in the building structures, outer surfaces of housings of furnitures, refrigerators, televisions or air conditioners, stainable locations such as window glass, or the like. Meanwhile, although various structures are exemplified above, the present invention is not limited thereto, and the silicon-containing liquid composition of the present invention can also be applied onto various objects or locations in order to impart a good anti-staining property thereto.

The first coating method of the present invention is such a simple method of impregnating a suitable medium such as paper, cloth and non-woven fabric with the silicon-containing liquid composition of the present invention, wringing the medium appropriately, if required, and then wiping the surface to be coated, with the medium. The second coating method of the present invention is such a method of forming the silicon-containing liquid composition of the present invention into an aerosol, and then spray-coating the aerosol onto the surface of structures.

In the first coating method, a paper, cloth or non-woven fabric may be preliminarily impregnated with the silicon-containing liquid composition of the present invention, stored in a sealed container, and taken out from the container when needed in order to wipe-coat the surface of structures therewith. Alternatively, upon use, a paper, cloth or non-woven fabric is impregnated with the silicon-containing liquid composition and squeezed appropriately, and then the surface of structures may be wipe-coated therewith. Using the first coating method, it becomes possible to simply apply the composition of the present invention onto either a freshly coated, already coated or non-painted surface of the structures. Since the first coating method is performed by wipe-coating, the composition applied is free from problems such as sag. In addition, the first coating method can be performed without preliminarily cleaning the surface to be treated, since contaminants previously attached can be wiped off simultaneously with the wipe-coating. The drying time after the wipe-coating is not less than 30 minutes, preferably not less than 2 hours at ordinary temperature.

In the second coating method, the silicon-containing liquid composition of the present invention is filled together with a propellant into a container to prepare an aerosol. As the propellant, there may be used known propellants such as dimethyl ether and LP gases. These propellants may be used alone or in the form of a mixture of any two or more thereof. The thus obtained aerosol may be applied onto the surface of the same structures as described in the above first coating method. The second coating method can be readily performed by directly spraying the aerosol onto the surface of structures. Meanwhile, if any contaminants are already attached onto the painted or non-painted surface of existing structures and the aerosol is spray-coated on such a surface, it is preferred that the surface is pre-treated in order to clean off the contaminants therefrom before spray-coating. On the contrary, in the case of structures having a freshly painted or repair-painted surface, or freshly prepared structures having a non-painted surface, it is possible to directly spray the aerosol onto the surface since no contaminants are present thereon. In this case, the aerosol can be spray-coated onto the freshly painted or repair-painted surface of structures or the non-painted surface of freshly prepared structures notwithstanding these surfaces are either dried or non-dried. The coating amount of the aerosol is in the range of 20 to 50 $g/m^2$.

Thus, in the above simple coating methods using the silicon-containing liquid composition of the present invention, it is possible to form on the surface of various structures, a thin coating film providing a good finished surface which is free from defects such as unevenness, sag and cracks, and is improved in film properties such as anti-staining property and weather resistance. As described above, the silicon-containing liquid composition of the present invention not only is stably stored in a liquid state, but also is not classified into dangerous substances under the Fire Protection Law because of a less content of organic solvents. Therefore, the composition of the present invention is preferred from the viewpoint of safety upon use. It is considered that the above advantages of the present invention can be achieved by blending the respective components at the well-balanced mixing ratio.

Thus, the silicon-containing liquid composition of the present invention can be maintained in a stable liquid state despite a less solvent content thereof and, therefore, is inhibited from being classified into dangerous substances under the Fire Protection Law. As a result, the composition can be improved in handling property and safety upon coating. In addition, the coating method using the above silicon-containing liquid composition can provide a simplified method capable of forming a uniform thin coating film on the surface of various structures. Further, the thus obtained coating film can exhibit excellent properties such as anti-staining property, weather resistance and contaminant-removing property.

EXAMPLES

The present invention will be described in more detail below by reference to examples, but these examples are not intended to limit the scope of the present invention thereto. Meanwhile, "%" used herein represents "% by weight" unless otherwise specified.

Preparation Example 1

The following components wherein "MS51" represents a partially hydrolyzed condensate of methyl silicate, (tradename: "MKC Silicate MS51" produced by Mitsubishi Chemical Corporation; formula: $SiO_{0.8}(OCH_3)_{2.4}$), were mixed together at the below-mentioned mixing ratio at room temperature for 20 minutes, thereby preparing a silicon-containing composition (1) in the form of a colorless transparent liquid.

Composition:

| | |
|---|---|
| MS51 | 100 parts by weight* (calculated as $SiO_2$) |
| 8% solution of aluminum-based catalyst | 1.8 parts by weight |
| Industrial ethanol | 5,385 parts by weight |
| Ion-exchanged water | 7,500 parts by weight |

*The content of MS51 calculated as $SiO_2$ was 0.8% by weight.

The thus obtained silicon-containing composition (1) was evaluated according to the testing method for dangerous substances prescribed under the Fire Protection Law (Government Ordinance for "Regulation of Dangerous Objects" Article 1, §3 through Article 1, §8; Ministerial Ordinance for "Tests and Properties of Dangerous Objects"). It was confirmed that the alcohol content of the silicon-containing composition (1) was less than 60% by weight, and the water content thereof was about 57% by weight. In addition, as a result of the measurements conducted in Kita-Kyushu-City Fire Defense Science Research Institute, it was confirmed that the flash point (tag-closed type) of the silicon-containing composition (1) was 25.3° C., and the burning point (tag-open type) thereof was 31.5° C. Meanwhile, the flash point and burning point of 60-wt. % ethanol aqueous solution were 22.6° C. and 24.7° C., respectively. As a result, it was recognized that the silicon-containing composition (1) did not classified into the dangerous substances prescribed under the Fire Protection Law. Meanwhile, under the Fire Protection Law, substances having an alcohol content of less than 60% by weight and flash and burning points higher than those of the 60-wt. % ethanol aqueous solution can be excluded from the dangerous substances prescribed thereunder.

Preparation Example 2

0.5 part by weight of an anti-cissing agent (tradename: "BYK-301" produced by BYK Chemie Co., Ltd.) was further added to the 1,000 parts by weight of the silicon-containing composition (1) prepared in Preparation Example 1. The resultant mixture was mixed at room temperature for 20 minutes, thereby preparing a silicon-containing composition (2).

Preparation Example 3

The same procedure as defined in Preparation Example 1 was conducted except that a partially hydrolyzed condensate of ethyl silicate (tradename "ES40" produced by Hulse Japan Co., Ltd.) was used instead of "MKC Silicate MS51" and the amount of the industrial ethanol was controlled such that the content of "ES40" (calculated as $SiO_2$) in the liquid was 0.8% by weight. Although the raw mixture having the same composition as that used in Preparation Example 1 was mixed at room temperature for 20 minutes, the "ES40" remained not dissolved, and the obtained liquid became whitely turbid. For this reason, the amounts of the industrial ethanol and the ion-exchanged water were increased up to minimum amounts capable of completely dissolving the "ES40" and obtaining a uniform colorless transparent solution. The raw mixture thus controlled was mixed at room temperature for 20 minutes, thereby preparing a silicon-containing composition (3). It was confirmed that the silicate content in the composition was 0.8% by weight, calculated as $SiO_2$. The composition of the raw mixture used above is shown below.

Composition:

| | |
|---|---|
| ES40 | 100 parts by weight (calculated as $SiO_2$) |
| 8% solution of aluminum-based catalyst | 1.8 parts by weight |
| Industrial ethanol | 8,531 parts by weight |
| Ion-exchanged water | 4,296 parts by weight |

The thus obtained silicon-containing composition (3) contained the industrial ethanol in an amount of about 65% by weight, i.e., had an alcohol content of not less than 60% and, therefore, was regarded as the dangerous substances prescribed under the Fire Protection Law. Thus, when ethyl silicate was used, a large amount of alcohol was to be added in order to obtain a uniform liquid composition, resulting in production of the dangerous substances under the Fire Protection Law. Therefore, it was confirmed that the use of methyl silicate was preferred from the viewpoint of safety.

Preparation Example 4

The following components were mixed together and reacted at 40° C. for 2 hours, thereby preparing a silicon-containing composition (8) in the form of a colorless transparent liquid.

| Composition: | |
| --- | --- |
| MS-51 | 100 parts by weight (calculated as SiO$_2$) |
| 8% solution of aluminum-based catalyst | 1.8 parts by weight |
| Industrial ethanol | 3,000 parts by weight |
| Ion-exchanged water | 2,000 parts by weight |

Preparation Example 5

The following components were mixed together and reacted at 50° C. for 1 hour.

| Composition: | |
| --- | --- |
| MS-51 | 100 parts by weight (calculated as SiO$_2$) |
| 8% solution of aluminum-based catalyst | 1.8 parts by weight |
| Industrial ethanol | 1,500 parts by weight |
| Ion-exchanged water | 1,500 parts by weight |

The obtained silicon-containing composition was further diluted at room temperature to adjust the following final mixing ratio, thereby preparing a silicon-containing composition (9) in the form of a colorless transparent liquid.

| Composition: | |
| --- | --- |
| MS-51 | 100 parts by weight (calculated as SiO$_2$) |
| 8% solution of aluminum-based catalyst | 1.8 parts by weight |
| Industrial ethanol | 5,000 parts by weight |
| Ion-exchanged water | 5,000 parts by weight |

Preparation Example 6

The following components were mixed together and reacted at 600° C. for 2 hours, thereby preparing a silicon-containing composition (10) in the form of a colorless transparent liquid.

| Composition: | |
| --- | --- |
| MS-51 | 100 parts by weight (calculated as SiO$_2$) |
| 8% solution of aluminum-based catalyst | 1.8 parts by weight |
| Industrial ethanol | 1,250 parts by weight |
| Ion-exchanged water | 250 parts by weight |

Preparation Example 7

The following components were mixed together and reacted at room temperature for 1 hours, thereby preparing a silicon-containing composition (11) in the form of a colorless transparent liquid.

| Composition: | |
| --- | --- |
| MS-51 | 100 parts by weight (calculated as SiO$_2$) |
| 8% solution of aluminum-based catalyst | 1.8 parts by weight |
| Industrial ethanol | 2,500 parts by weight |
| Ion-exchanged water | 675 parts by weight |

Example 1

A duster was immersed in the silicon-containing composition (3), and lightly wrung by hand. Then, an exterior painted surface of an automobile was wiped with the impregnated duster. The amount of the diluted liquid composition applied was 16 g/m$^2$.

Example 2

A paper towel was impregnated with the silicon-containing composition, and stored in a sealed container. After one month, the impregnated paper towel was taken out from the container. The stained surface of a heavy oil tank having a top coat made of a fluororesin-based resin paint (tradename: "PF-250B" produced by Dainippon Shikizai Kougyo Co., Ltd.) was washed with water and then dried in air. The thus cleaned surface of the heavy oil tank was wiped with the impregnated paper towel in order to form a coating film of the silicon-containing composition thereon. It was confirmed that the amount of the silicon-containing composition (2) applied was about 50 g/m$^2$.

Example 3

The silicon-containing composition (2) prepared in Preparation Example 2 and LPG as a propellant were charged at a volume ratio of 100:200 into an aerosol container, thereby preparing an aerosol composition. The thus obtained aerosol composition was spray-coated onto the surface of the same heavy oil tank as used in Example 2. It was confirmed that the amount of the aerosol applied was 35 g/m$^2$.

Comparative Example 1

The same procedure as defined in Example 1 was conducted except that a part of the surface of the automobile remained uncoated with the diluted solution of the silicon-containing composition (2).

Comparative Examole 2

The same procedure as defined in Example 2 was conducted except that a part of the surface of the heavy oil tank remained uncoated with the silicon-containing composition (2).

The coated surfaces obtained in Examples 1 to 3 and Comparative Examples 1 and 2 were exposed to outside environments for half a year (test period: from June to December of 1998; location: Sanwa-machi, Sarushima-gun, Ibaragi-ken). After the exposure to outside environments, the coated surfaces were visually observed to determine the degree of contamination thereof. The results are shown in Table 1 below.

TABLE 1

Observation results of contamination after half-year exposure to outside environments

| Examples and Comparative Examples | Initial contamination on surface of coating film | Degree of contamination after half year | |
|---|---|---|---|
| | | Dirt | Fallstreifen |
| Example 1 | None | Small | None |
| Example 2 | None | Small | None |
| Example 3 | None | Small | None |
| Comparative Example 1 | None | Large | Some |
| Comparative Example 2 | None | Large | Much |

In the column "degree of contamination" of Table 1, "Small" means that a small amount of dirt attached onto the coating was visually observed; "Large" means that a large amount of dirt attached was visually observed; and "None" in the sub-column "Fallstreifen" means that no fall streaks were visually observed.

Comparative Example 3

The same procedure as defined in Preparation Example 2 was conducted except that the amount of the industrial ethanol blended was changed to 80 parts by weight, thereby preparing a silicon-containing composition (4). The thus obtained composition was a turbid liquid, and failed to form a uniform solution.

Comparative Example 4

The same procedure as defined in Preparation Example 2 was conducted except that the amount of the industrial ethanol blended was changed to 60,000 parts by weight, thereby preparing a silicon-containing composition (5). The thus obtained composition was coated on the surface of the objective, and exposed to outside environments in the same manner as in Example 1. As to the degree of contamination of the coating after half-year exposure, the attachment of dirt was evaluated as "Large", and the fallstreifen was evaluated as "Much".

Comparative Example 5

The same procedure as defined in Preparation Example 2 was conducted except that the amount of water blended was changed to 70 parts by weight, thereby preparing a silicon-containing composition (6). The thus obtained composition was coated on the surface of the objective, and exposed to outside environments in the same manner as in Example 1. As to the degree of contamination of the coating after half-year exposure, the attachment of dirt was evaluated as "Large", and the fallstreifen was evaluated as "Much".

Comparative Example 6

The same procedure as defined in Preparation Example 2 was conducted except that the amount of water blended was changed to 60,000 parts by weight, thereby preparing a silicon-containing composition (7). The thus obtained composition was coated on the surface of the objective, and exposed to outside environments in the same manner as in Example 1. As to the degree of contamination of the coating after half-year exposure, the attachment of dirt was evaluated as "Large", and the fallstreifen was evaluated as "Much".

Example 4

A glass plate was wiped with the silicon-containing composition (2) prepared in Preparation Example 2.

Example 5

A glass plate was wiped with the silicon-containing composition (8) prepared in Preparation Example 4.

Example 6

A glass plate was wiped with the silicon-containing composition (9) prepared in Preparation Example 2.

Comparative Example 7

A glass plate was wiped with the silicon-containing composition (5) used in Comparative Example 4.

Comparative Example 8

A glass plate was wiped with the silicon-containing composition (6) used in Comparative Example 6.

Comparative Example 9

A glass plate was wiped with the silicon-containing composition (10) prepared in Preparation Example 6.

Comparative Example 10

A glass plate was wiped with the silicon-containing composition (11) prepared in Preparation Example 7.

The water contact angles and surface resistivities of the coated surfaces of the glass plates prepared in Examples 4–6 and Comparative Examples 7–10 were measured under 50% RH at 23° C. by a CA-A Type manufactured by Kyowa Kaimen Kagaku Co., Ltd. (water contact angle) and by TR8411 Type manufactured by Advantest Co., Ltd. (surface resistivity), respectively. The results are shown in Table 2.

TABLE 2

| | Example 4 | Example 5 | Example 6 | |
|---|---|---|---|---|
| | | | At reaction stage | Final product |
| Water/Ethanol ratio | 58/42 | 40/60 | 50/50 | 50/50 |
| Hydrolysis percentage (%) | 20800 | 5540 | 4150 | 13800 |
| Water contact angle | 20 | 18 | — | 15 |
| Surface resistivity (*) | $2.1 \times 10^8$ | $1.5 \times 10^8$ | — | $8.0 \times 10^7$ |

| | Comparative Example 7 | Comparative Example 8 | Comparative Example 9 | Comparative Example 10 |
|---|---|---|---|---|
| Water/Ethanol ratio | 11/89 | 92/8 | 17/83 | 21/89 |
| Hydrolysis percentage (%) | 20800 | 166000 | 692 | 1870 |
| Water contact angle | 62 | 54 | 50 | 47 |
| Surface resistivity (*) | $1.1 \times 10^{14}$ | $6.5 \times 10^{13}$ | $4.2 \times 10^{13}$ | $2.5 \times 10^{13}$ |

What is claimed is:

1. A silicon-containing liquid composition comprising (A) 100 parts by weight of an organosilicate, calculated as $SiO_2$, (B) 0.1 to 10 parts by weight of a catalyst, (C) 5,000 to 30,000 parts by weight of water, and (D) 5,000 to 30,000 parts by weight of a solvent, and having a hydrolysis percentage of 10,000 to 90,000%, a weight ratio of the water (C) to the solvent (D) being in the range of 30:70 to 80:20, said composition being produced by contacting (A) 100 parts by weight of the organosilicate, calculated as $SiO_2$, (B) 0.1 to 10 parts by weight of the catalyst; (C) 500 to 5,000 parts by weight of the water; and (D) 100 to 5,000 parts by weight of the solvent, with each other; reacting a resultant mixture until a hydrolysis percentage thereof reaches 1,000 to 90,000%; and diluting a resultant reaction mixture with additional amounts of the water (C) and the solvent (D) to adjust a final hydrolysis percentage thereof into 10,000 to 90,000%.

* * * * *